D. H. Burrell,
Dairy Heater.
No. 112,120. Patented Feb. 28, 1871.
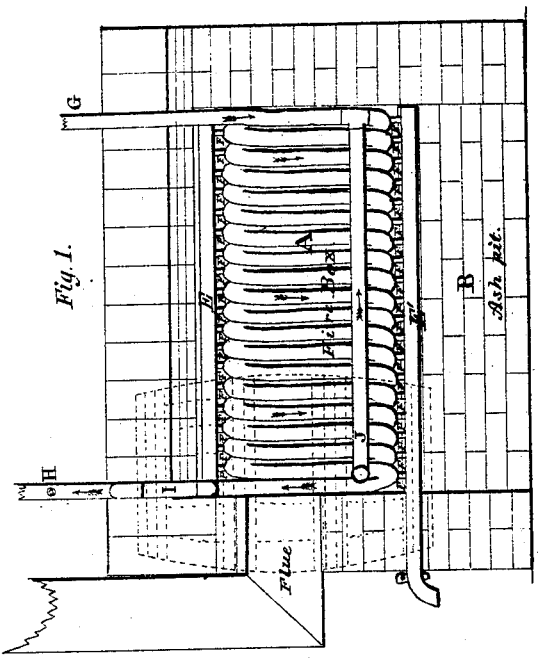
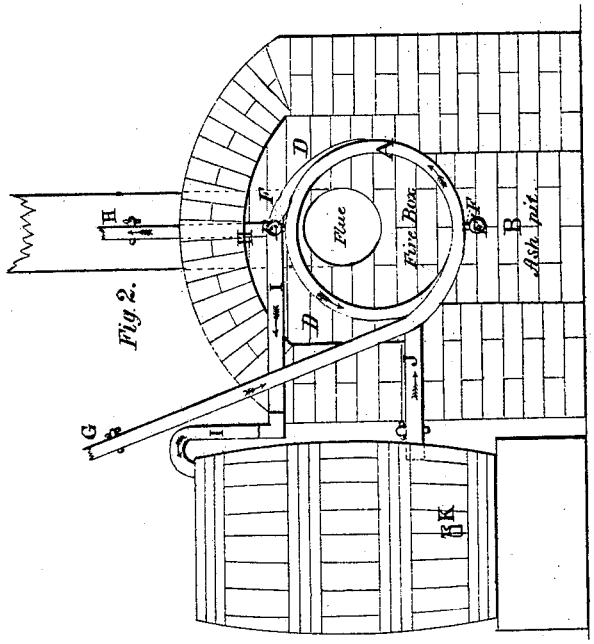
Witnesses.
John C. Cunningham
Watts T. Loomis
Inventor
David H. Burrell

United States Patent Office.

DAVID H. BURRELL, OF LITTLE FALLS, NEW YORK.

Letters Patent No. 112,120, dated February 28, 1871.

IMPROVEMENT IN APPARATUS FOR HEATING LIQUIDS.

The Schedule referred to in these Letters Patent and making part of the same.

I, DAVID H. BURRELL, of Little Falls, in the county of Herkimer and State of New York, have invented a new and improved Apparatus for Heating Liquids, of which the following is a specification.

My invention consists of a cylindrical coil of metal pipes, a little separated from each other, their plane vertical or nearly so, the entire coil laid horizontal or nearly so, for a fire-box and grate, (see drawings, figures 1 and 2, A.)

Each of these coils is connected, top and bottom, with horizontal pipes, E E', running the entire length of the coil or fire-box by short pipes, F F F, or other means, so as to allow water to pass from the coils to the horizontal pipes.

The pipe at the top E, with the continuation H, is to allow the escape of air and steam from the top of the coils; the pipe at the bottom E', to enable the coils to be emptied from water or sediment, and is kept closed at both ends when in use.

This cylindrical coil is laid horizontally in an arch of masonry or stone, constituting an exterior fire-box, D, resting on and supported by benches on each side, about half-way from the bottom to the horizontal diameter of the cylindrical coil, and having a space above that, between the walls of the exterior fire-box and the coils, of an inch or more, and with an ash-pit, B, of several inches in depth, below the bottom of the coils and extending the full height of the cylinder.

The front of the exterior fire-box is closed with a door and valve, to regulate the draught, and the smoke-flue proceeds from the opposite end.

The front end of the coil connects with the water-supply pipe G, which has a stop-cock, to regulate the flow of water, and also by a branch-pipe, J, with a stop-cock with the bottom of the hot-water tank or vessel, to contain hot water.

The remote end I empties into the upper part of the hot-water vessel, as does also the upper horizontal pipe E.

A branch-pipe, H, also extends from the upper horizontal pipe upward higher than the hot-water vessel, with a stop-cock, to allow the escape of air and surplus steam from the coils.

By means of the pipes connecting the hot-water vessel at the bottom and top a circulation of water can be maintained through the horizontal cylindrical coil, freely or slowly, regulated by the stop-cock in front, so as to keep the water in the vessel at the required temperature.

The fire is built within the cylindrical coil, the bottom acting as a grate, thus utilizing the heat at the bottom as well as around the whole surface.

The hot-water vessel is connected with the cheese-vats by pipes with stop-cocks at top and bottom, so as to secure a circulation of hot water as may be desired.

What I claim as my invention, and desire to secure by Letters Patent, is—

1. The cylindrical coil of pipe filled with water, laid horizontally, or nearly so, as a fire-box, the lower part of the coils constituting the grate over the ash-pit.

2. The combination of the several coils with a horizontal pipe running the entire height, for the escape of air and steam from the top of each coil.

3. The combination of the several coils by a pipe at the bottom, to let out the water and sediment.

DAVID H. BURRELL.

Witnesses:
JOHN C. CUNNINGHAM,
WATTS T. LOOMIS.